No. 705,445. Patented July 22, 1902.
A. H. RIETZSCHEL.
CAMERA.
(Application filed July 11, 1899.)
(No Model.) 2 Sheets—Sheet 1.

Witnesses
F. H. Schott
Autex Elefner

Inventor
Alexander H. Rietzschel
by Max Georgie
his Attorney.

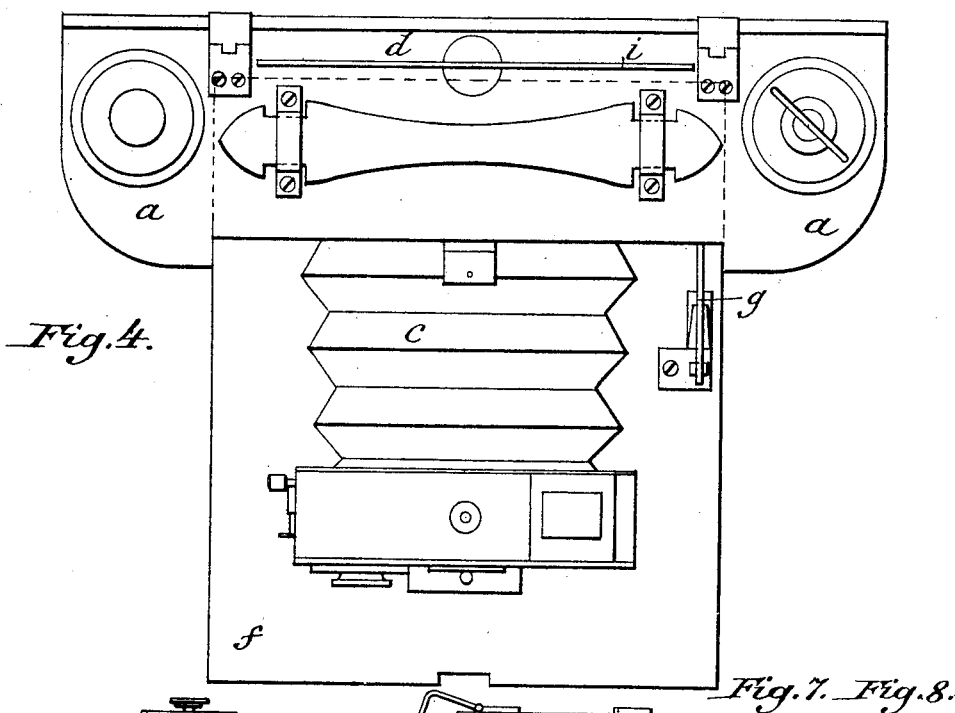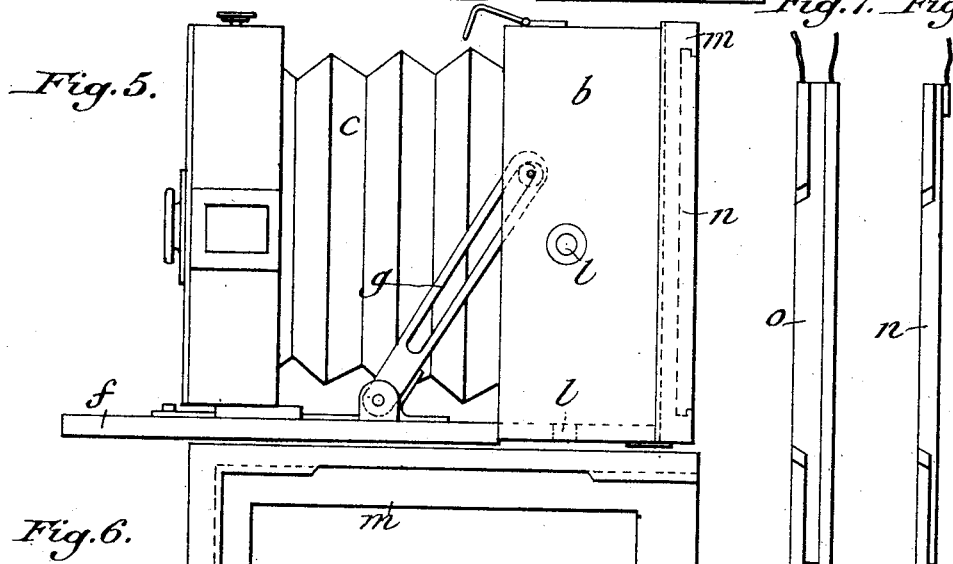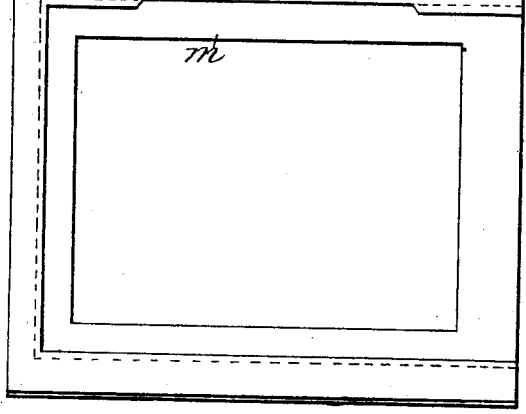

UNITED STATES PATENT OFFICE.

ALEXANDER HEINRICH RIETZSCHEL, OF MUNICH, GERMANY.

CAMERA.

SPECIFICATION forming part of Letters Patent No. 705,445, dated July 22, 1902.

Application filed July 11, 1899. Serial No. 723,507. (No model.)

*To all whom it may concern:*

Be it known that I, ALEXANDER HEINRICH RIETZSCHEL, a subject of the Emperor of Germany, residing at Munich, Kingdom of Bavaria, Empire of Germany, have invented certain new and useful Improvements in Cameras, of which the following is a full, clear, and exact description.

The present invention involves improvements in hand photographic cameras according to which the camera may be employed for photographing with films or with plates, as desired, without, however, materially affecting the size and portability of the apparatus.

In order to render the present specification more easily intelligible, reference is had to the accompanying drawings, in which similar letters of reference denote similar parts throughout the several views.

Figure 1:
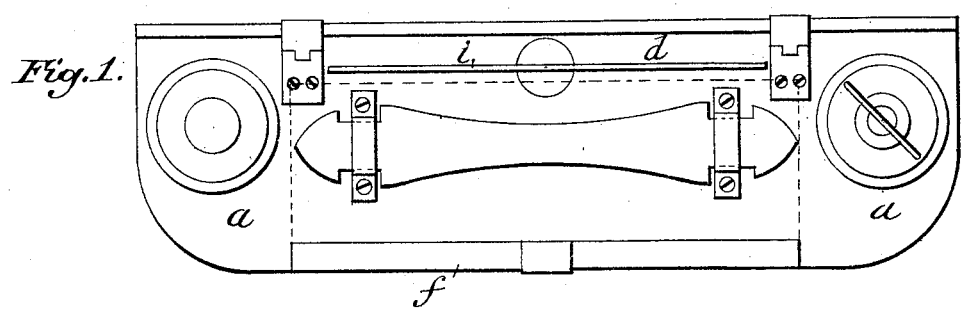
Figure 2:
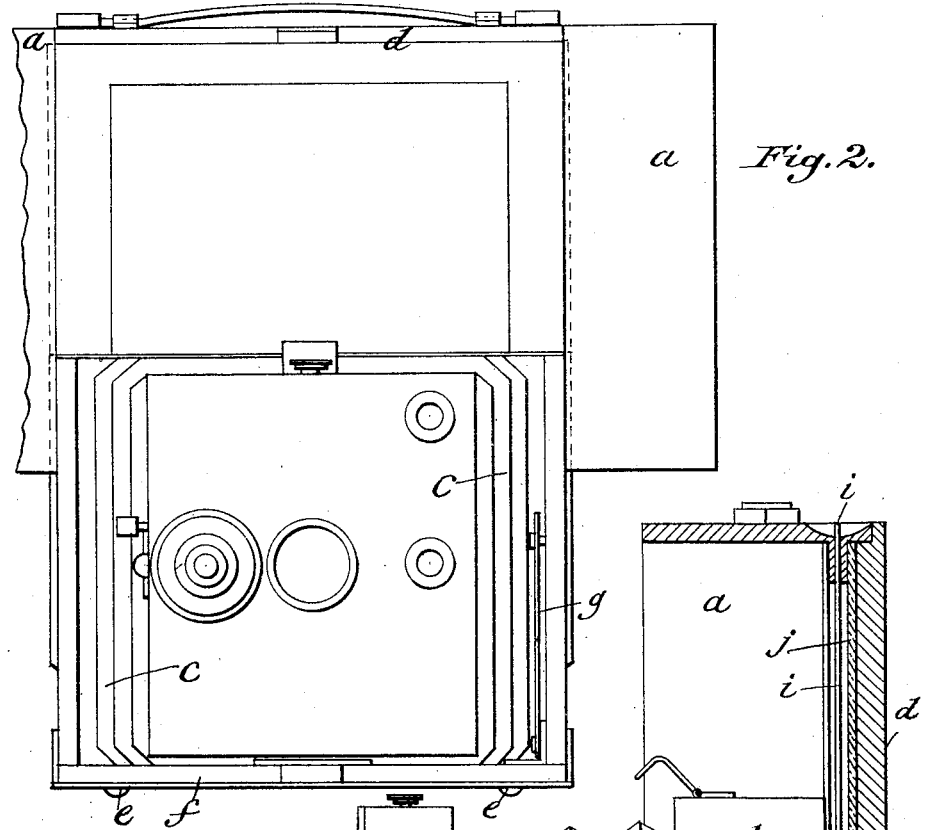
Figure 3:
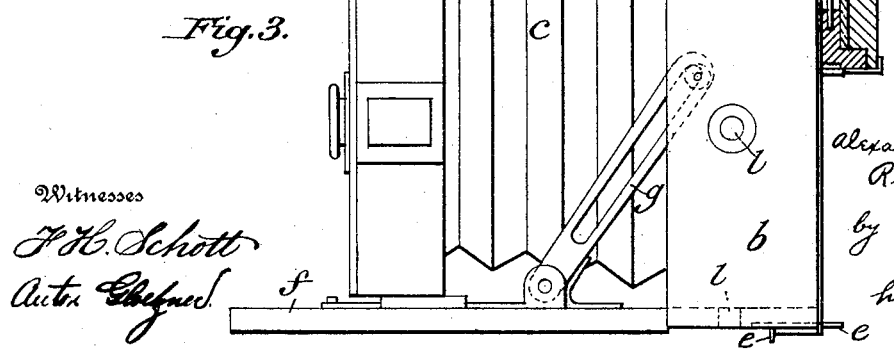

Figure 1 is a plan of the apparatus folded together; Fig. 2, a front elevation of the apparatus, showing the film-containing portion partly drawn out for removal; Fig. 3, a cross-section through Fig. 2; Fig. 4, a plan of the apparatus with the camera drawn out; Fig. 5, a side elevation of the apparatus with the film-box removed; Fig. 6, a plan of a frame to be attached to the apparatus when the film-box is removed, and Figs. 7 and 8 end views of frames to be inserted as hereinafter set forth.

The end chambers $a$ $a$ contain the rolls for the film, and between the two the box $b$ is arranged to receive the camera-bellows. The box or casing $d$ connects the two roll-chambers, and the film $j$ passes through this casing, which is provided with a light-tight closing-slide $i$, Fig. 3. The camera is provided with the ordinary expansible part or bellows $c$, and the cover $f$ is adapted to fold down in the ordinary manner and be retained in position by means of a self-adjusting stay-bar $g$.

$e$ designates a slidable leaf-spring in the bottom of the box $b$, adapted to be pushed into engagement with a notch or socket in the film-box $d$ to hold said box in proper position behind the lens during the act of photographing.

In photographing with the film the camera is arranged as shown at Fig. 4, the lid being folded down and the part $c$ drawn out, the film-box being adjusted in proper position on the box $b$. If it is desired to photograph with the plate, the apparatus may be placed on the tripod, for which purpose the housing or box $b$ is provided with screw-holes $l$ $l$, or the same may be used by hand in the ordinary manner without the tripod. The roll-box $a$ $a$ $d$ is slid off the box $b$, and in order to preserve the proper distance of the lens from the plate a frame $m$, Fig. 5, may be fitted onto the end of the box $b$, into which either the ground-glass-plate frame $n$, Fig. 8, or the double-plate holder $o$, Fig. 7, may be slid in the usual manner. When the operation has been completed, the camera is folded back into the box $b$ and the lid turned up and fastened by any suitable hook device, Fig. 3.

I claim as my invention—

1. The combination with the main casing having a rectangular central recess and end chambers to contain the film-rolls and a suitable frame and slide at the back of such recess in front of the back proper between which the film passes, of a supplemental casing carrying the focusing apparatus and means for holding such casing within the rectangular recess, so that the front face is flush with the front face of the main portion of the casing as and for the purpose specified.

2. The combination with the main casing having a rectangular central recess and end chambers to contain the film-rolls and a suitable frame and slide at the back of such recess in front of the back proper, behind which the film passes, of a supplemental casing carrying the focusing apparatus, means for holding the casing to the back within the rectangular recess, and the bolt in the front casing or portion designed to fit into a corresponding socket or recess in the back of the main portion, so as to securely hold the parts from vertical displacement as and for the purpose specified.

3. The combination with the casing carrying the film-rolls, having a central recessed portion and grooves at the back of the recess, of a supplemental casing fitted to the recess, said supplemental portion carrying ribs adapted to interlock with said grooves, said ribs also providing guides adapted to receive a plate when the supplemental portion is used independently of the film-holding portion substantially as described.

In witness whereof I have hereunto set my hand in presence of two witnesses.

ALEXANDER HEINRICH RIETZSCHEL.

Witnesses:
 BENJ. NUSBAUM,
 EMIL HENZEL.